May 8, 1951          E. JANOWSKI          2,552,431

WELDING ELECTRODE

Original Filed Nov. 2, 1948

*INVENTOR.*
Edward Janowski
BY
*Albert P. Davis*
*Attorney*

Patented May 8, 1951

2,552,431

UNITED STATES PATENT OFFICE 2,552,431

WELDING ELECTRODE

Edward Janowski, Pawtucket, R. I.

Original application November 2, 1948, Serial No. 57,912. Divided and this application February 23, 1950, Serial No. 145,696

5 Claims. (Cl. 219—47)

My invention relates to an electrode and more particularly relates to an electrode for applying a radio frequency heat to simultaneously weld a plurality of strips of plastic material together to make a plastic Venetian blind ladder tape, and is a division of my copending application Serial No. 57,912, filed November 2, 1948, for "Ladder Tape for Venetian Blinds and Method and Apparatus for its Manufacture."

An object of my invention is to provide a device particularly adapted for use in radio frequency dielectric welding which will function to give a strong bond without arcing.

Another object of my invention is to provide a device for performing radio frequency dielectric welding having electrodes universally mounted thereon.

Another object of my invention is to provide a novel electrode suitable for use in welding strips of plastic material together by means of high radio frequency heat.

Other objects of the invention will be obvious and will in part appear hereinafter.

The invention accordingly comprises the apparatus possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawing wherein.

Figure 1:
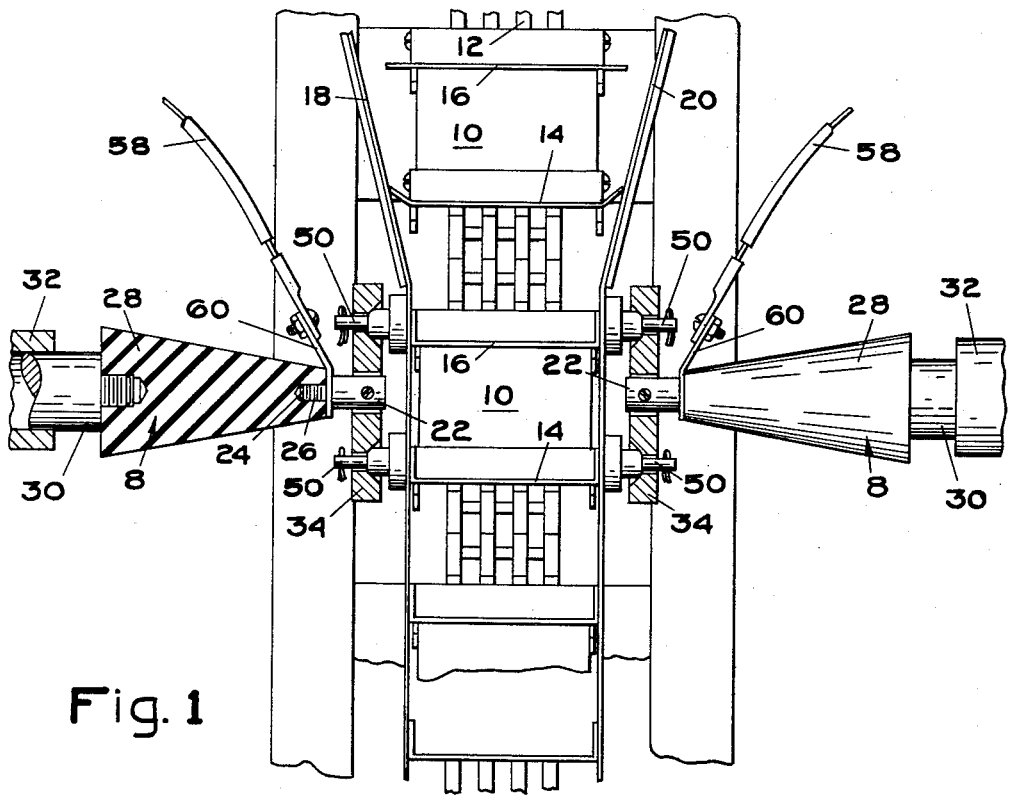
Figure 1 is a front elevational view partly in section of my improved welding electrodes and showing them in welding position on an apparatus for manufacturing plastic Venetian blind ladder tape.
Figure 2:
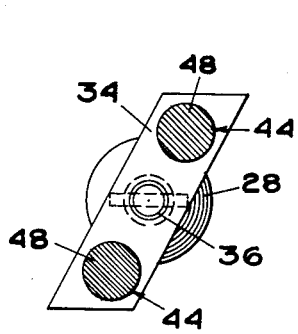
Figure 2 is a side elevation looking outwardly towards the center of an electrode.
Figure 3:
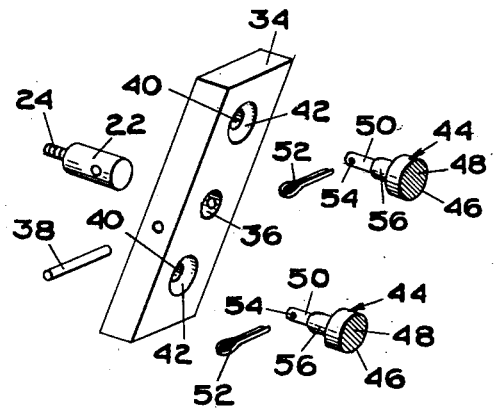
Figure 3 is a diagrammatic exploded perspective view of my improved electrode structure adapted to weld the staggered ends of a pair of adjacent rungs in a plastic Venetian blind ladder tape.

In Fig. 1 two of my electrodes 8 are disclosed in operating position on an apparatus for manufacturing plastic Venetian blind ladder tape, disclosed and claimed in my above mentioned copending application Serial No. 57,912. Broadly the tape manufacturing apparatus comprises a plurality of jigs 10, disclosed and claimed in my copending application Serial No. 145,697, filed February 23, 1950, for "Jig," mounted on and carried by conveyor chain 12. Each jig 10 carries two vertically spaced and horizontally staggered plastic ladder rung strips 14 and 16. As jigs 10 move downwardly they pass between two converging tapes of plastic material 18 and 20 to cause the ends of rung strips 14 and 16, which extend beyond the sides of jigs 10, to be folded back along the sides of said jigs. When each jig reaches a predetermined position between electrodes 8 chain 12 stops and said electrodes move towards each other to contact tapes 18 and 20 opposite the folded back ends of rungs 14 and 16. When electrodes 8 contact strips 18 and 20 a timing mechanism, which forms no part of the present invention, causes a high radio frequency electric current to be sent from the electrodes through tapes 18 and 20, the folded back ends of rungs 14 and 16, and a conducting material forming the holding portion of jigs 10, to heat said tapes 18 and 20 and the ends of rungs 14 and 16 to cause said rung ends to be welded to said tapes. After a predetermined time the radio frequency electric current is shut off, electrodes 8 are retracted, jigs 10 move forward another increment, and the cycle repeats.

Each of my electrodes 8 preferably comprise a metallic cylindrical member 22, having a threaded shank 24 projecting outwardly therefrom. Shank 24 is screwed in a threaded hole 26 formed in one end of a frustro conical block 28 of high frequency insulating material. While any suitable type of high frequency insulating material may be employed for block 28, I preferably construct said block out of glass bonded mica. The other end of block 28 is threaded on rod 30. Sleeve 32 is slidably carried on rod 30 and is adapted to be attached to the frame of a Venetian blind ladder tape manufacturing apparatus to reciprocally mount said electrode thereon.

In the preferred embodiment shown I provide a structure which will weld the opposite two ends of a pair of staggered rungs 14 and 16 to the tapes 18 and 20 during each stop of the apparatus feeding mechanism. For this purpose I provide each electrode with a metal plate 34 of generally rectangular shape, having a central electrode receiving hole 36 of slightly greater diameter than cylindrical member 22. Plate 34 is pivotally mounted on cylindrical member 22 by means of transverse pivot pin 38 which extends through aligned holes in plate 34 and said cylindrical member 22. Plate 34 is also provided with holes 40 adjacent each end thereof and parallel to hole 36. The inner ends of holes 40 are countersunk as at 42. Heat applying buttons 44 having inner heads 46, which preferably have an embossed inner surface 48 adapted to contact tapes 18 and 20, are mounted in holes 40 for universal movement on plate 34 by means of their shanks 50 which pass through said holes 40. Buttons 44 are held on plate 34 by cotter pins 52 which extend through suitable holes 54 in the outer ends of shanks 50 and semispherical portions 56 between said heads 46 and said shanks 50. The semispherical portions 56 abut the countersunk hole ends 42 to universally mount each button 44 on electrode 8.

In the embodiment shown wires 58 which carry the high radio frequency electricity are attached to each respective electrode by a suitable connector 60. In the embodiment shown the connector 60 comprises a flat plate having a hole therein surrounding shank 24 of cylindrical member 22 and abutting the end of its respective cylindrical member 22. Wires 58 may be connected to connector 60 in any suitable manner.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. An electrode having a conducting inner end, an intremediate insulating portion, means attached to said insulating portion and adapted to reciprocally mount said electrode on a frame, a conducting plate, said plate having an opening therein of a size sufficient to receive said conducting inner end, means for retaining said conducting inner end in said opening for limited pivoted movement relative thereto, said plate also having a plurality of holes therein having their axes substantially parallel to the axis of said opening, a plurality of heat applying buttons, one for each hole, and means adapted to mount a button in each hole for universal movement relative to said plate.

2. An electrode having an intermediate insulating portion, means attached to the outer end of said insulating portion and adapted to reciprocally mount it on a frame, a conducting inner member carried by the inner end of said insulating portion, a conducting plate, said plate having an opening therein of a size sufficient to receive said conducting inner member, means for retaining said conducting inner end in said opening for limited pivotal movement relative thereto, said plate also having a plurality of holes therein having their axes substantially parallel to the axis of said opening, a plurality of heat applying buttons, each button having a head and a shank, and means adapted to mount the shank of a button in each hole for universal movement relative to said plate.

3. An electrode having an intermediate insulating portion, means attached to the outer end of said insulating portion and adapted to reciprocally mount it on a frame, a conducting inner member carried by the inner end of said insulating portion, a conducting plate, said plate having an opening therein of a size sufficient to receive said conducting inner member, means for retaining said conducting inner end in said opening for limited pivotal movement relative thereto, said plate also having a plurality of holes therein having their axes substantially parallel to the axis of said opening and having their inner ends countersunk, a plurality of heat applying buttons, each button having a head and a shank, and means adapted to mount the shank of a button in each hole for universal movement relative to said plate.

4. An electrode having an intermediate insulating portion, means attached to the outer end of said insulating portion and adapted to reciprocally mount it on a frame, a conducting inner member carried by the inner end of said insulating portion, a conducting plate, said plate having an opening therein of a size sufficient to receive said conducting inner member, means for retaining said conducting inner end in said opening for limited pivotal movement relative thereto, said plate also having a plurality of holes therein having their axes substantially parallel to the axis of said opening and having their inner ends countersunk, a plurality of heat applying buttons, each button having a head and a shank and semispherical portions between said heads and said shanks, and means adapted to universally mount the shank of a button in each hole whereby said semispherical portion abuts the countersunk portion of the hole.

5. An electrode having an intermediate frustro conical insulating portion, means attached to the larger end of said frustro conical insulating portion and adapted to reciprocally mount it on a frame, a conducting inner member carried by the smaller end of said insulating member, a conducting plate, said plate having an opening generally centrally thereof and of a size to loosely receive said conducting inner member, means for retaining said conducting inner end in said opening for limited pivotal movement relative thereto, said plate also having a plurality of holes therein having their axes substantially parallel to the axis of said opening and having their inner ends countersunk, a plurality of heat applying buttons, each button having a head and a shank and semispherical portions between said heads and said shanks, said shanks being of smaller diameter than said holes, and means adapted to universally mount the shank of a button in each hole whereby said semispherical portion abuts the countersunk portion of the hole.

EDWARD JANOWSKI.

REFERENCES CITED

The following references are of record in the file of this patent:

UNITED STATES PATENTS

| Number | Name | Date |
|---|---|---|
| 1,899,233 | Derby | Feb. 28, 1933 |
| 2,422,525 | Brown et al. | June 17, 1947 |
| 2,434,330 | Merz et al. | Jan. 13, 1948 |
| 2,436,732 | Rowe | Feb. 24, 1948 |
| 2,442,451 | Albin | June 1, 1948 |
| 2,472,820 | Graham et al. | June 14, 1949 |
| 2,506,626 | Zottu | May 9, 1950 |
| 2,519,193 | MacDermaid | Aug. 15, 1950 |